United States Patent [19]

Sakmann et al.

[11] Patent Number: 4,514,667
[45] Date of Patent: Apr. 30, 1985

[54] METHOD AND APPARATUS FOR THE CONSTANT SPEED CONTROL OF BRUSHLESS DC MOTORS

[75] Inventors: Walter H. Sakmann, Nufringen; Volker Zimmermann, Sindelfingen, both of Fed. Rep. of Germany

[73] Assignee: International Business Machines Corporation, Armonk, N.Y.

[21] Appl. No.: 488,843

[22] Filed: Apr. 26, 1983

[30] Foreign Application Priority Data

Apr. 29, 1982 [DE] Fed. Rep. of Germany ....... 8210367

[51] Int. Cl.³ .............................................. H02P 6/02
[52] U.S. Cl. .................................... 318/254; 318/138; 318/672
[58] Field of Search ................... 318/138, 254 A, 254, 318/439, 603, 672

[56] References Cited

U.S. PATENT DOCUMENTS

| | | | |
|---|---|---|---|
| 3,911,338 | 10/1975 | Igarashi et al. | 318/254 X |
| 3,967,174 | 6/1976 | Kögler et al. | 318/254 |
| 3,999,108 | 12/1976 | Tanikoshi | 318/254 A X |
| 4,135,120 | 1/1979 | Hoshimi et al. | 318/254 A X |
| 4,240,014 | 12/1980 | Müller | 318/328 |
| 4,249,116 | 2/1981 | Hieda | 318/138 X |
| 4,250,435 | 2/1981 | Alley et al. | 318/138 |
| 4,270,074 | 5/1981 | Duckworth et al. | 318/254 |
| 4,412,161 | 10/1983 | Cornaby | 318/603 X |
| 4,415,845 | 11/1983 | Oudet | 318/254 X |

FOREIGN PATENT DOCUMENTS

| | | |
|---|---|---|
| 0061824 | 10/1982 | European Pat. Off. . |
| 2349770 | 6/1974 | Fed. Rep. of Germany . |
| 117484 | 9/1980 | Japan ................................. 318/138 |
| 2010537 | 6/1979 | United Kingdom . |

OTHER PUBLICATIONS

Edminister, J. A.; "Electric Circuits", Schaum's Outline Series, Ch. 16, McGraw-Hill Book Co., 1965.
IBM Technical Disclosure Bulletin, vol. 21, No. 7, Dec. 1978, to S. D. Keidl, "Dual-Phase-Locked Brushless DC Motor Velocity Control", pp. 2951–2952.
IBM Technical Disclosure Bulletin, vol. 19, No. 10, Mar. 1977, to S. D. Keidl, "Speed Regulation for Brushless DC Motors", pp. 3831–3832.

Primary Examiner—Stanley J. Witkowski
Assistant Examiner—Bentsu Ro
Attorney, Agent, or Firm—David D. Bahler; J. S. Gasper; J. Jancin, Jr.

[57] ABSTRACT

Method and apparatus for the constant speed control of a brushless DC motor, whose pole windings receive a pulsed control voltage between their commutation points, control being a function of the speed characteristics of the motor, and the commutation points being synchronized with the drop times of the motor current and the control voltage pulses. In a state in which there are no load changes, the motor current substantially rises or drops between a maximum value $I_{max}$ and a minimum value $I_{min}$ according to the pulse mode. In the event of changes in the motor load, a mean motor sum current is retained for maintaining the speed.

10 Claims, 17 Drawing Figures

FIG. 7A
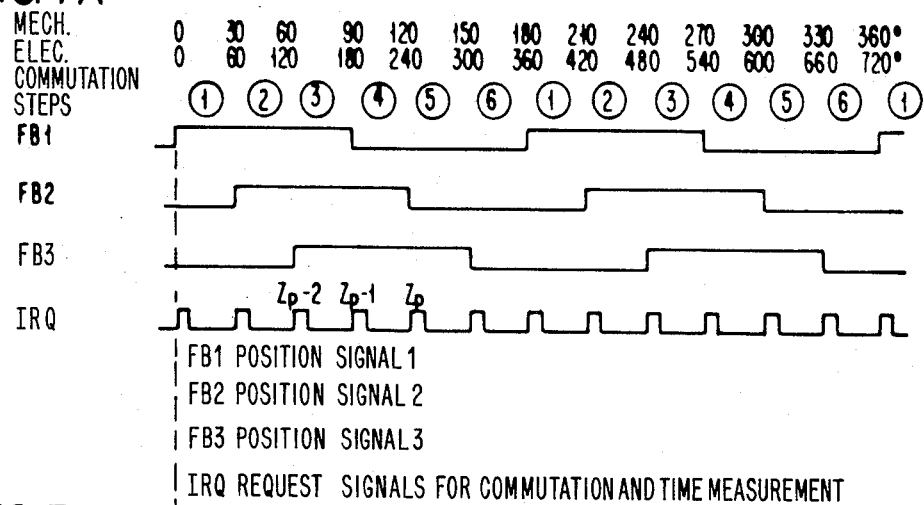
FB1 POSITION SIGNAL 1
FB2 POSITION SIGNAL 2
FB3 POSITION SIGNAL 3
IRQ REQUEST SIGNALS FOR COMMUTATION AND TIME MEASUREMENT
FIG. 7B
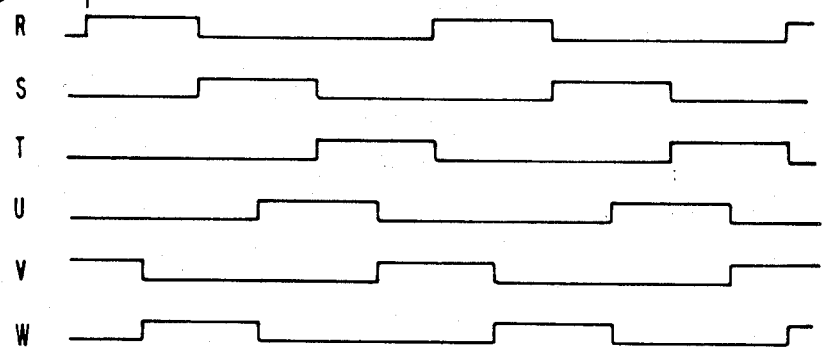
FIG. 8
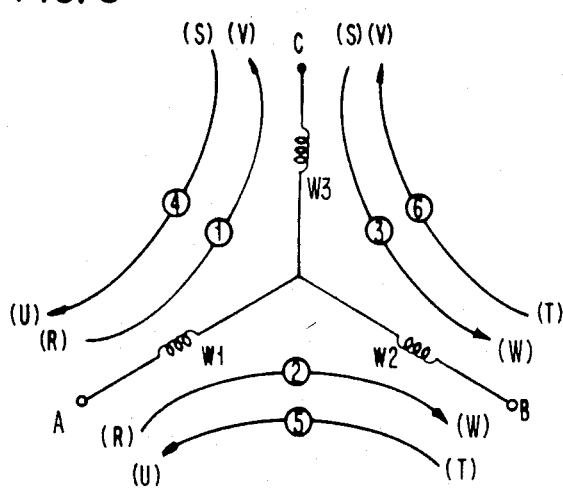
FIG. 9
| STEP | FB1 | FB2 | FB3 | R | S | T | U | V | W |
|------|-----|-----|-----|---|---|---|---|---|---|
| ①    | 1   | 0   | 0   | 1 | 0 | 0 | 0 | 1 | 0 |
| ②    | 1   | 1   | 0   | 1 | 0 | 0 | 0 | 0 | 1 |
| ③    | 1   | 1   | 1   | 0 | 1 | 0 | 0 | 0 | 1 |
| ④    | 0   | 1   | 1   | 0 | 1 | 0 | 1 | 0 | 0 |
| ⑤    | 0   | 0   | 1   | 0 | 0 | 1 | 1 | 0 | 0 |
| ⑥    | 0   | 0   | 0   | 0 | 0 | 1 | 0 | 1 | 0 |

METHOD AND APPARATUS FOR THE CONSTANT SPEED CONTROL OF BRUSHLESS DC MOTORS

DESCRIPTION

1. Technical Field

The invention pertains to a method and apparatus for the constant speed control of brushless DC motors used for driving character bands in printers.

2. Background Art

The drives so far employed for this purpose have been, for example, synchronous motors, to ensure that the speed at which the character band rotates is substantially constant. External influences, such as friction or the simultaneous impacting of a plurality of print hammers, could lead to sudden speed drops of the rotating band. The speed changes caused by variations of the torque frequently led to undesired oscillations and, in extreme cases, to a standstill of the motor.

As is known, the speed of a synchronous motor is determined by the frequency of applied power and the number of poles of such motor. Synchronous motors have relatively poor torque characteristics and their speed is not controllable without varying the frequency of applied power. A typical torque curve of a synchronous motor is shown by solid line in FIG. 1, however, in unfavourable cases the torque curve of synchronous motors has a saddle point P during motor start-up. When normal operation is effected torque variations lead to speed changes and thus to the above-mentioned disadvantages.

To eliminate these disadvantages, so-called collectorless or brushless DC motors have been used to drive band printers. A typical torque curve of a brushless DC motor is shown in FIG. 2. Speed control is possible either by means of varying the magnitude of the excitation current I or by varing the commutation angle. Control by means of the excitation current I affords an improved torque with the speed remaining substantially unchanged.

DC brushless motors can be of the external rotor type or of the internal rotor type. Compared to internal rotor motors, external rotor motors on account of their great mass are more favourable in respect of the impact loads occurring in printers.

As for the typical operation of an external rotor brushless DC motor, the external rotor is made up in segments of permanent magnets moving past fixed poles of the internal stator. The poles of the stator are magnetized by electrically energized pole windings. The force active between the poles of the stator and the permanent magnets of the external rotor causes the latter to move in a rotational direction. The windings, associated with the individual poles of the stator, are energized in a particular commutation sequence to drive the external rotor as required. For energization to be effected in this way, it is, of course, necessary to relate the position of the external rotor relative to the stator. This position information can be sensed by so-called Hall effect sensors which may be arranged on one pole of the stator. These sensors supply electrical signals for each motor rotation, and the mechanical rotary position of the motor is derived from these signals. From this position information data may be derived as to the times at which a commutation circuit is to apply an electrical energization signal to respective pole windings of the stator.

For the speed control of brushless DC motors, it is known to measure the instantaneous speed, and to compare it with a desired value. As a function of the result of this comparison, the motor is energized in a particular manner, which is hereinafter referred to as pulse mode. This means motor energization current, or motor sum current, during the individual commutation phases has a sawtooth pattern which is attributable to the pole windings of the motor being subjected to a pulse sequence in the commutation phase. As a result of the inductance of the windings, there are current drops and rises corresponding to an exponential function. After a maximum value of current has been reached during the pulse-on time the motor sum current drops to a minimum value during the pulse-off time $T_{off}$. The motor sum current then rises during the subsequent pulse-on time to the maximum value. It is pointed out that by suitably selecting the maximum and minimum current limits, an almost constant speed is obtained which is independent of load variations.

Speed deviations can be fed to a controller which raises or lowers the maximum and minimum current limits as a function of the speed. If the speed is too low, the current limits are both raised. If the speed is too high, the current limits are both lowered.

FIG. 4 shows the pulse period, formed as a function of the current-off and current-on times, without commutation. This pulse period is designated as TV2. The control voltage pulse period, consisting of the pulse-off time and the current rise time up to the point of commutation, is designated as TV1. This shows that the time TV1 is used as a controlled variable, whereas the time TV2 serves to maintain the average value of the motor sum current at a particular value.

The motor sum current, for example, can be measured in a known manner as a function of the voltage drop across a measuring resistor. U.S. Pat. No. 3,967,174 describes such an arrangement for the clocked current control of a collectorless DC motor, wherein a current sense resistor is provided which is essential for determining the pulse-on times $T_{on}$ and the pulse-off times $T_{off}$ for the pulse mode. In other words, for speed control with this arrangement, it is necessary to know the motor sum current value.

Another known method for the constant speed control of brushless DC motors is by use of an RC component to control the current. This approach renders such control invariable because the characteristics yielded by the RC component vary as the control speed varies.

Such a system for speed control is described in U.S. Pat. No. 4,240,014. In this speed control arrangement, a signal, whose value is characteristic of the deviation of the motor speed from a desired value, is generated as a function of the respective time difference between the pulse intervals of a pulse train which are dependent upon the motor speed, and as a function of the substantially uniform constant time of an RC component. For this purpose, one of several storage elements is loaded at a given time according to predetermined rules and subsequently discharged after at least part of the constant time has elapsed, with the signal at the storage element serving as a speed-dependent control signal. The storage element is referred to as a capacitor which is charged by a load element and whose load voltage acts as a speed-dependent analog signal. Subsequently, optimum current control is possible only if suitable control elements are available for each speed (or speed change). However, such elements would render the control circuit enormously complex.

It is therefore desirable to provide a constant speed controller for a brushless DC motor that is easily adapted to different speeds without changing controller circuit elements and without sensing the motor sum current.

DISCLOSURE OF THE INVENTION

To eliminate the disadvantages discussed above, it is an object of this invention to provide a method and apparatus for the constant speed control of brushless DC motors, for which the current values do not have to be known. The invention does not provide for analog control (so that circuit-dependent characteristics do not have to be considered) but for digital control, observing only the motor speed and particular parameters associated with the motor and the load. In this connection, it is possible to emphasize particular parameters for fast optimum current control.

The motor characteristics and the motor behavior during preceding periods of time permit the time TV1 (see FIG. 11) to be computed as a function of the speed characteristics of the motor. This time includes the current drop time TV3, at whose start commutation is effected, and the subsequent current rise time up to the time at which the current reaches the maximum value $I_{max}$. The current peaks during the pulse mode without commutation also correspond to this value $I_{max}$. The value TV1 determines the current rise for a particular speed and a particular load. The value TV1 is predetermined to prevent motor oscillations which occur whenever there are great current deviations outside the $I_{min}$ and the $I_{max}$ range.

In order to avoid undesireable current and speed variations at the time of commutation, the commutation points are synchronized with the drop times of the motor sum current.

In a preferred embodiment, the computation of the time TV1 and the commutation synchronization function is performed by a microcomputer. The microcomputer receives, as inputs, signals denoting the commutation steps and commutation points of the motor. As outputs, the microcomputer provides signals that are used to control a motor driver circuit which in turn drives the windings of the motor.

This preferred embodiment of the invention is illustrated in the drawings and will be described in detail below.

BRIEF DESCRIPTION OF THE DRAWINGS

FIGS. 7A and B are pulse diagrams for commutation of the motor according to FIG. 5 with a driver circuit according to FIG. 6.

FIG. 8 is a diagrammatic sketch of the current flow direction for phase energizing the motor according to FIG. 5 with a driver circuit according to FIG. 6 during the commutation steps 1 to 6, as shown in FIGS. 7 and 9.

FIG. 9 is a table for storing the position signals (FB1, FB2, FB3), the commutation steps and the control signals R, S, T, U, V, W for the driver circuit.

DESCRIPTION OF THE INVENTION

Figure 1:
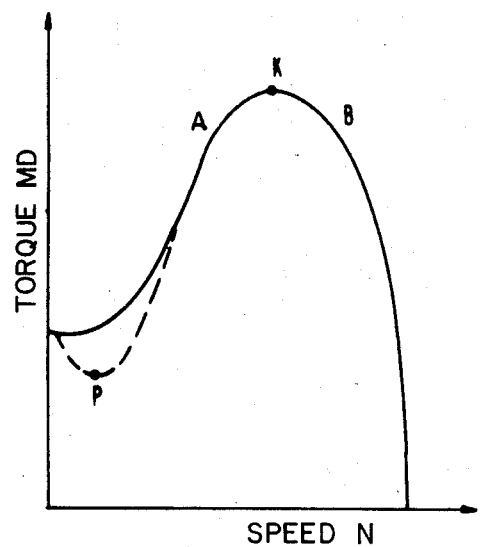
FIG. 1 is a graph of the torque as a function of the speed in the case of synchronous motors.

FIG. 1 is a graph of the torque as a function of the speed in the case of synchronous motors. As is known, the speed of synchronous motors is determined by the frequency of applied power and the number of poles. Synchronous motors have a relatively poor starting torque (section A), and their speed is not variable. In unfavorable cases, their torque curve according to FIG. 1 even has a saddle point P. In section B, in which normal operation is effected, torque variations lead to considerable speed changes and thus to the afore-mentioned disadvantages.

Figure 2:
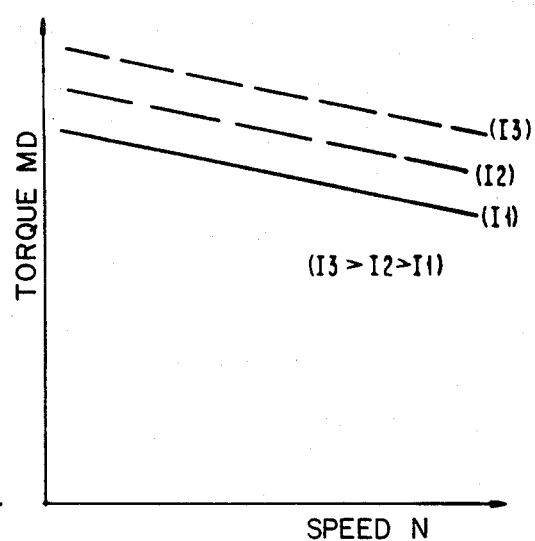
FIG. 2 is a graph of the torque as a function of the speed in the case of brushless DC motors.

To avoid these disadvantages, so-called collectorless or brushless DC motors have been used for band printers. Their torque curve as a function of the speed is shown in FIG. 2. Speed control can be effected either by means of varying the magnitude of the energization current I (I1<I2<I3) or by varying the commutation angle. Control by means of current I yields an improved torque, with the speed remaining unchanged. Compared to internal rotor motors, external rotor motors on account of their great mass are more favorable in respect of impact loads.

Figure 5:
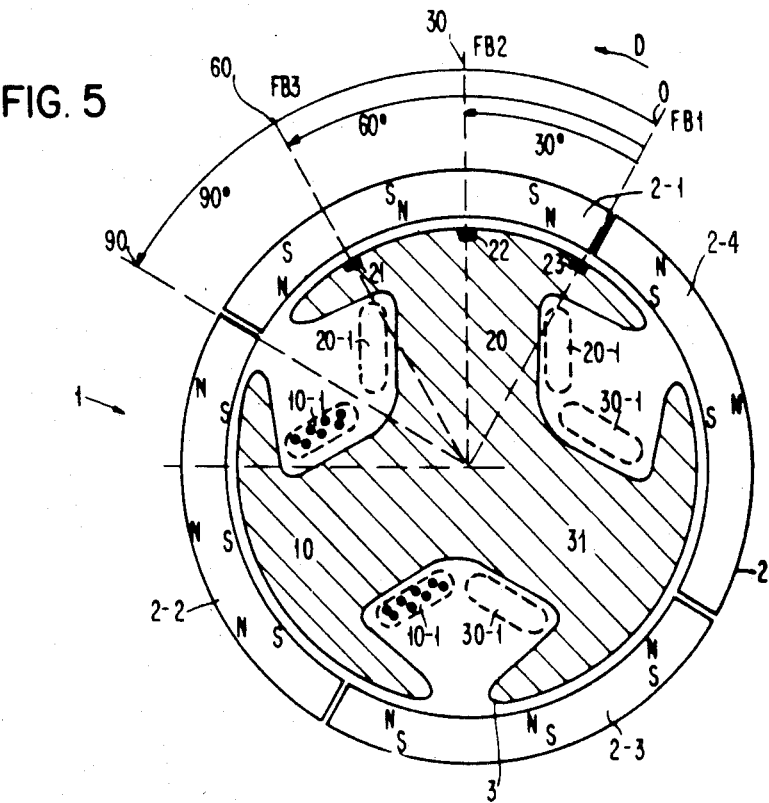
FIG. 5 is a diagrammatic sketch of an external rotor brushless DC motor.

FIG. 5 is a diagrammatic sketch of a brushless DC motor designed as an external rotor motor.

As for the typical operation of such a motor 1, the external rotor 2 is made up in segments of, for example, four permanent magnets 2-1, 2-2, 2-3 and 2-4 moving in the arrow-marked direction D past the fixed poles (e.g., three) 10, 20, 31 of the 10-1, 20-1 and 30-1. The force active between the poles of the stator and the permanent magnets of the external rotor causes the latter to be moved.

Energization of the windings associated with the individual poles of the stator is effected in a particular commutation sequence, to drive the external rotor as required.

For energizing the windings in this manner, it is, of course, necessary to know the position of the external rotor relative to the stator. This information is obtained by Hall effect sensors 21, 22, 23 which are arranged at the pole of stator 20. These sensors supply electrical signals corresponding to a rotation of the external rotor, so that the mechanical position of the external rotor 2 relative to the stator 3 can be deduced from these signals.

Figure 6:
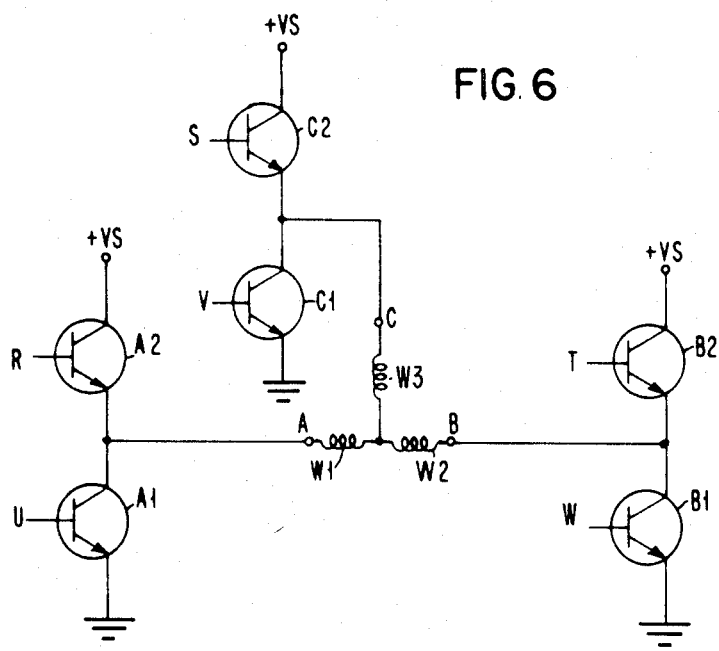
FIG. 6 is a schematic of a driver circuit for commutation of the motor according to FIG. 5.

From such position information the times may be derived at which the commutation circuit according to FIG. 6 has to apply electrical incrementation signals to the energizing coils of the stator.

The permanent magnet segments 2-1, 2-2, 2-3 and 2-4 of motor 1 are surrounded on the outside by a common soft-iron dome (not shown). The permanent magnets are oriented as designated by their north pole N and their south pole S. The windings 10-1, 20-1, 30-1 of the magnet poles 10, 20, 31 of stator 3 are designated in FIG. 6 as W1, W2 and W3 respectively.

FIG. 5 shows radially extending position lines 0, 30, 60, 90 according to a 30° segmentation on which this embodiment is based. For clarity, further position lines have been omitted. The ends of position lines 0, 30, 60 are designated by characters FB1, FB2, FB3. This designation is indicative of the energization of the individual motor windings at different times. The position signals FB1, FB2 and FB3, which are described below are also thus designated.

FIG. 6 is a simplified schematic of a driver circuit for commutation of the motor according to FIG. 5. The pole windings are designated as W1, W2 and W3. The pole windings are radially connected. The outer terminal of W1 is designated as A, that of W2 as B and that of W3 as C. These terminals A, B and C are subjected at particular times to electrical signals emitted by the circuit according to FIG. 6. These electrical signals are shown in FIG. 7B and in table of FIG. 9. It is pointed out that during the individual commutation steps, the pole windings are subjected to a pulsed control voltage. In other words, a pulse sequence is applied to the terminals of the respective pole windings during a commutation step.

For simplicity, FIGS. 7 and 9 show the respective driver control signals as a constant signal during the several commutation steps, to mark the length of the commutation step and not the pulse mode during the individual commutation steps.

A circuit consisting of two transistors is associated with each terminal A, B and C. The transistors are connected in series between ground and a supply voltage +Vs. The node between the transistors is connected to the respective terminal A, B and C. The transistors are switched on or off by means of a binary control voltage applied to their bases. The transistors of the circuit for terminal A are designated as A1 and A2, those for terminal B as B1 and B2 and those for terminal C as C1 and C2. The transistors with the index 1 (A1, B1 and C1) can be connected to ground. The control voltage for transistor A1 is designated as U, for transistor C1 as V and for transistor B1 as W. These control voltages U, V and W are not pulsed during the several commutation steps.

The control voltages for the transistors with the index 2 (A2, B2 and C2) serve to pulse the motor energization. Thus, according to FIGS. 7B and 10, the control voltages of these transistors during a commutation step are a sequence of rectangular pulses. The control voltage for transistor A2 is designated as R, for transistor B2 as T and for transistor C2 as S. If, as a result of the control voltage R, the supply voltage +Vs is temporarily switched through by transistor A2, the voltage at terminal A corresponds to this supply voltage as long as transistor A1 is switched off. If transistor A1 is ON, the voltage at terminal A is substantially identical with the ground potential. This applies in analogy to the transistor circuits associated with the terminals B and C.

The control times of the individual transistors A1, A2, B1, B2, C1, C2 may be seen from FIG. 7B. This figure shows the time relations of the curves of the different control voltages R, S, T, U, V, W (as previously pointed out the control signals R, S, T are shown in a non-pulsed form).

The illustration in FIG. 7 in conjunction with FIGS. 8 and 9 serves to explain the sequence of the individual commutation steps for the respective pole windings (briefly referred to as phase energization).

The time curve of the respective mechanical position of the external rotor relative to the stator of the motor appears as an abscissa in FIG. 7B. Position line 0 corresponds to an angle of rotation of 0°, position line 30 to a rotation of 30°, position line 60 to a rotation of 60°, etc. These angular positions 0°, 30°, 60°, etc., correspond to the commutation points. These are times at which variations may occur with respect to the control of transistors A1, A2, B1, B2, C1 and C2. In the chosen example, the mechanical commutation points of 0° to 360° are associated with the electrical commutation points 0° to 720° in FIG. 7A. A mechanical rotation by 180° corresponds to a full electrical period of 360° which is repeated for the mechanical rotation from 180° to 360°. Unless expressly stated to the contrary, the term angle of rotation refers to mechanical rotation. The first commutation step 1 extends from a rotation of 0° to 30°, the second commutation step 2 from a rotation of 30° to 60°, the third commutation step 3 from a rotation of 60° to 90°, etc. Of transistors A1, B1, C1 and A2, B2, C2, only two are ON in each case, i.e., one transistor with the index 1 and one transistor with the index 2. For example, in commutation step 1, transistor C1 with the control voltage V is conductive for the entire commutation step, whereas transistor A2 is ON because of its pulsed control voltage R. For simplicity, the transistors, to which a pulsed control voltage is applied in a commutation step, are referred to as being ON when in actual fact, pulsing of the control voltage of these transistors leads only to a pulsed current flow during the respective commutation step.

A direct short circuit of the supply voltage +VS to ground is not possible, as the input signals of a transistor pair (e.g., A1/A2) never overlap.

For example, in the ranges 0° to 30° and 180° to 210°, R switches on transistor A2, while transistor A1 remains OFF as a result of U. During this time, the supply voltage +VS is switched to A and fed across windings W1 and W3 to terminal C connected to ground. In the ranges under consideration of 0° to 30° and 180° to 210°, C is connected to ground, because V switches through transistor C1. As for the angle of rotation 0° to 30° and 180° to 210°, respectively, transistor B2 remains OFF as a result of T and transistor B1 remains OFF as a result of W. In other words, for the range mentioned, terminal B, owing to voltage divider W1/W3, is substantially at an electrical potential equal to half the supply voltage +VS/2. For this range, the supply voltage drops from terminal A across the two windings W1 and W3 to the grounded terminal C.

Figure 10:
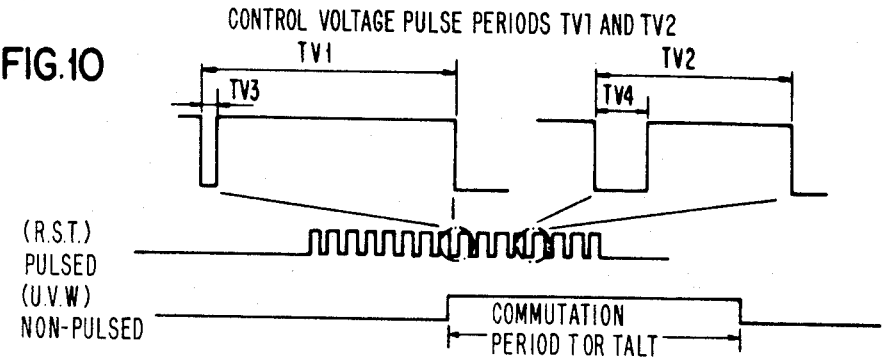
FIG. 10 is a graph of a "pulsed" and a "non-pulsed" control signal for the driver circuit and two partly enlarged illustrations of control voltage pulse periods.

As previously mentioned, the description has been simplified. In actual fact, the control voltage R, as shown in FIG. 10, has a pulsed curve. As for the ranges of rotation 0° to 30° and 180° to 210° respectively, (commutation step 1) there is a pulsed phase energization for windings W1 and W3. Pulsing, in this context, means that during a particular commutation step, the supply voltage +VS is switched only at the clock of the pulsed control voltage of the transistor for the pole windings. The control voltages U, V and W do not have to be pulsed, as they only switch their associated transistors A1, B1 and C1 at the times shown in FIG. 7B.

It will be described below what is implied by position signals FB1, FB2 and FB3 and the IRQ request signals for commutation and time measurement in FIG. 7A.

It has already been pointed out that in the chosen example of the motor according to FIG. 5 three Hall effect sensors 23, 22 and 21 are positioned at a spacing of 30° relative to each other at the stator pole 20 of motor 1. These Hall effect sensors serve to determine the position of the external rotor relative to the stator. Each Hall effect sensor emits a signal when it is passed by the interface of two adjacent permanent magnet segments of the external rotor with opposite magnetic orientation For example, if the interface between the permanent magnet segments 2-1 and 2-4 passes the Hall effect sensor 23, the latter produces an electrical sensor signal. As during a motor rotation successive interfaces have an opposite magnetic polarity and there are four external rotor segments, the polarity of each respective sensor signal changes after each (mechanical) 90° rotation of the external rotor when an interface passes the sensor. A Schmitt trigger circuit (not shown), whose binary output signal is shown as a signal sequence FB1, FB2 or FB3 (referred to below as position signal FB1, position signal FB2 and position signal FB3, respectively), is associated with each sensor. Thus, the Schmitt trigger of sensor 23 supplies the position signal FB1, the Schmitt trigger of sensor 22 the position signal FB2 and the Schmitt trigger of sensor 21 the position signal FB3. In each position signal sequence, the signal curve changes from high to low and vice versa after each 90° motor rotation.

As there are altogether three Hall effect sensors 23, 22, and 21, staggered relative to each other by 30°, the time curve of the position signal sequence corresponds to that shown in FIG. 7A.

Curve FB2 shows that the interface 2-1/2-4 passes sensor 22 after a 30° rotation and the interface 2-4/2-3 passes the same sensor after a further rotation by 90° (i.e., after 30°+90°=120°). The FB2 position signal changes its binary level each time (i.e., at 30° and 120°). This applies in analogy to all position signals FB1, FB2 and FB3.

Thus, for the chosen motor embodiment, the signals FB1, FB2 and FB3 have a total number of twelve switching edges for each complete motor rotation.

As will be explained in detail below, an IRQ signal, a request signal for commutation and time measurement, is generated in a conventional manner from each FB1, FB2 and FB3 switching edge.

FIG. 8 is a representation of the directions of current flow between the individual terminals A, B and C in the sense of the supply voltage dropping (pulsed) at the windings W1, W2 and W3, respectively, for all 30° segments. The designations of the individual commutation steps 1, 2, 3, 4, 5 and 6 according to FIG. 7A and the 30° commutation segments in FIG. 8 have been retained. Thus, FIG. 8 shows quite clearly at which commutation steps (1-6) there is a current flow between particular terminals A, B and C, respectively. It has already been pointed out that for commutation segment 1 there is a current flow from terminal A to terminal C. In FIG. 8 this fact has been taken into account by the arrow designated as commutation step 1. The tail of the arrow is designated as (R) and the head as (V). This means that for the duration of commutation step 1, transistor A2 is switched on by its pulsed control voltage R, while transistor C1 is switched on by its control voltage V. Association of the individual current arrows 1 to 6 in FIG. 8 with the different pole windings shows which of the windings are active during the several commutation steps. In the case of current arrow 1, the windings concerned are W1 and W3. This applies in analogy to all other current arrows. In commutation step 5, for example, current flows from terminal B to terminal A through windings W2 and W1, with transistor B2 being switched on by the pulsed control voltage T and transistor A1 being switched on by the control voltage U.

The facts inherent in FIG. 8 can be readily represented in a table as shown in FIG. 9. For each commutation step (lines 1 to 6), this table indicates in the columns for the control voltages R, S, T, U, V and W whether the relevant control voltage is present (binary 1) or not (binary 0). Thus, for example, for the table line with commutation step 1 for control voltages R and V there is a "1" entry, whereas for all other control voltages S, T, U, W there is a "0" entry. It is pointed out that the R, S, T entries are indicative of a pulse mode.

The position signals FB1, FB2 and FB3 mentioned in conjunction with FIG. 7A have also been taken into account for the table in FIG. 9. The binary signal levels for the FB1, FB2 and FB3 signal sequence are represented in the table as a binary "0" or "1". For example, during commutation segment 5 (120° to 150°): FB1=0; FB2=0; and FB3=1.

Commutating and pulsing the motor energization

It will be explained below to what extent the commutation points and the pulsing of the motor energization can influence each other. Upon completion of a commutation step (designated as 1 to 6 in FIGS. 7A and 8), the supply voltage +VS applied (pulsed) across two windings is switched off and applied across two other windings.

For example, in commutation step 1, an energization voltage, applied across windings W1 and W3, is switched off at the end of commutation step 1 and applied across windings W1 and W2 for the time of commutation step 2. During this switching, one winding (in this example, winding W3) is "disconnected", while a new winding (in this case, W2) is "connected". However, winding W1 is common to the disconnected winding W3 and the connected winding W2. When a previously inactive winding (in this case, W2) is connected, the current rise (designated as δ in FIG. 11) occurring as a result of the winding inductance is slow compared to the fast rise β during the pulse mode without commutation. This means that if the voltage across W1 and W3 were to be switched off without commutation, there would be a current drop to $I_{min}$ designated as α in FIG. 11. If the voltage +VS were subsequently reapplied across W1 and W3 during the pulse mode, there would be a current rise designated as β. For the reasons explained above, this current rises much faster than it would as a result of connecting a previously inactive winding in the case of commutation.

A consequence of this is that in the case of commutation, the time TV1 between commutation point PC with the subsequent current drop γ to $I_{min}$ at point PB and the current rise δ to the current value $I_{max}$ at PA exceeds the time TV2 elapsing in the pulse mode without commutation and including the current drop α from $I_{max}$ to $I_{min}$ and the subsequent current rise β from $I_{min}$ to $I_{max}$. It is pointed out that in the case of rectangular control pulses, the leading and trailing current edges are subject to an exponential function resulting from the inductances of the pole windings.

Figure 11:
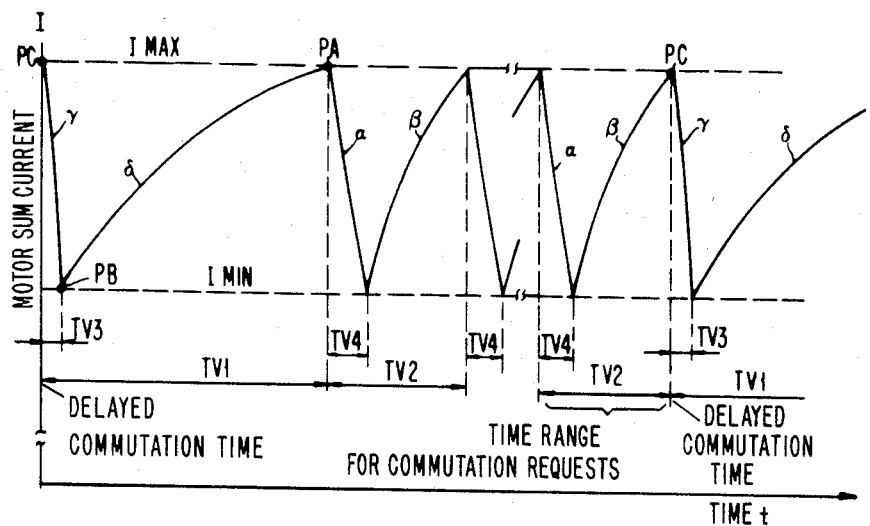
FIG. 11 is a graph of the time curve of the pulsed motor sum current with delayed synchronization of commutation.

From this it follows that the time TV1 always exceeds the time TV2. In the case of FIG. 11, it is assumed that commutation is effected at PC. The current drop time TV3 after commutation may be less than the current drop time TV4 in the pulse mode without commutation. The reason for this is that when a winding is disconnected in the case of commutation, only part of the energy in the connected winding still remains to be discharged.

Speed control is a function of the time variables TV1, TV2, TV3 and TV4. These time variables are computed by a processor according to a speed-dependent algorithm and are used as a basis for speed control.

Ideally, the current values in FIG. 11 vary between $I_{max}$ and $I_{min}$. Minor variations in the current curve for the predetermined time TV3 or TV1, may lead to points PB and PA differing slightly from $I_{min}$ and $I_{max}$. Further slight differences may occur if commutation does not occur at point PC but slightly later during the pulse-off time in the pulse mode. In such cases, the actual current drop time may become longer, assuming the value TV4 in extreme cases.

However, such deviations do not noticeably affect the mean value of the current needed for a commutation step and which is decisive for speed control.

Figure 4:
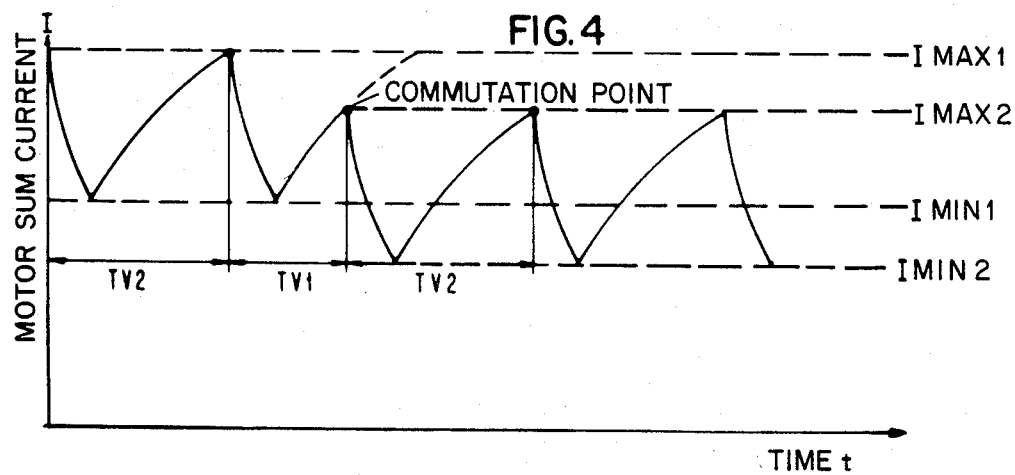
FIG. 4 is a graph of the pulsing of the motor energization without current measurement in the absence of synchronization with commutation.

It is essential, however, that commutation does not coincide with the time of a current rise β of the pulse mode but that it occurs at the earliest time after $I_{max}$ has been reached at PC. Otherwise, there would be a current curve corresponding to FIG. 4. The current would no longer vary between the values $I_{min1}$ and $I_{max1}$ but drop after commutation to a value below $I_{min1}$, namely, to $I_{min2}$, to subsequently rise to the value $I_{max2}$ (less than $I_{max1}$). This shows quite clearly that the mean current value decisive for the pulse period TV1 after commutation is smaller than for the pulse period TV2 before commutation. Such a drop in the mean current value decisive for control purposes would eventually lead to uncontrolled current fluctuations and thus must be avoided by all means.

Figure 3:
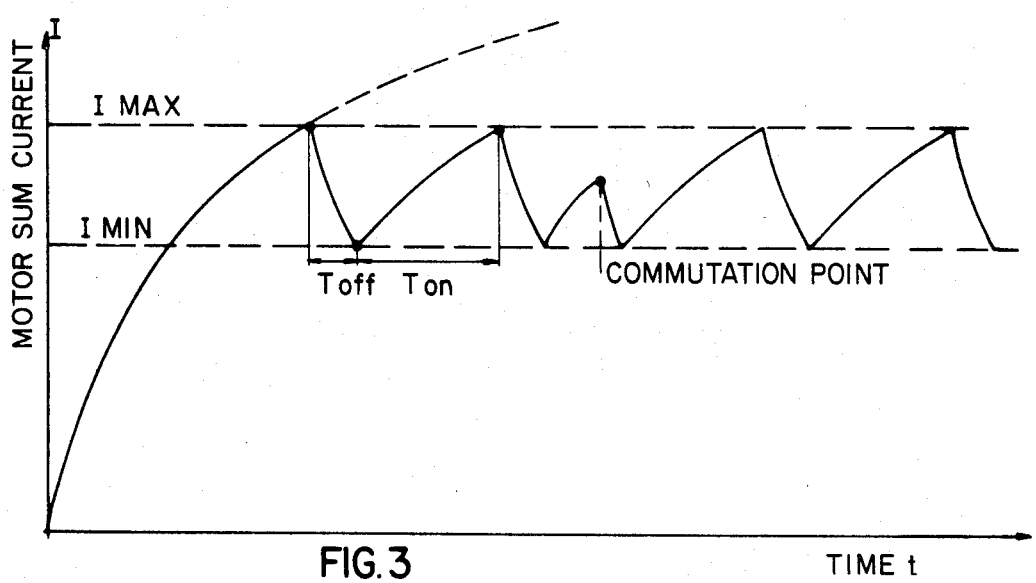
FIG. 3 is a diagrammatic representation for pulsing the motor energization on the basis of the current values $I_{min}$ and $I_{max}$.

In the case of speed control based on constantly measured current values according to FIG. 3, this problem does not arise, as, after the current has dropped to the value $I_{min}$, the pulse mode is resumed as a result of commutation at arbitrary points in time and a further current drop does not have to be tolerated.

Therefore, in the pulse mode (FIG. 11), commutation must be delayed to a time coinciding with the current drop time of the pulse mode. This means commutation may be effected only after the value $I_{max}$ has been reached during the current rise β in the pulse mode.

As the IRQ signal sequence (FIG. 7A) is known, the times at which commutation should be effected are known too. By comparing these times with the pulse-off and pulse-on times for pulsed motor energization, it can be determined whether the IRQ request signals for commutation occur in the pulse-on or pulse-off times. In the former case, commutation must be delayed until the current rise for a pulse-on period is completed.

It is pointed out that the pulse-on and pulse-off times for the pulse mode with and without commutation are computed in advance and that with these times being known it is possible to delay the commutation times so that they occur at the end of a current rise β for the pulse mode.

Determination of the time variables TV1, TV2, TV3 and TV4 for the speed-dependent algorithm for constant speed control.

The time variables are assumed to be defined as follows:

TV1 = Control voltage pulse period after commutation, comprising a current drop γ and a current rise δ for forming a current sawtooth for motor energization.

TV2 = Control voltage pulse period without commutation, comprising a current drop α and a current rise β for forming a current a sawtooth for motor energization.

TV3 = Time required for the current drop (pulse-off time) after a commutation point) (TV3 is within TV1).

TV4 = Time required for the current drop (pulse-off time) for the pulse mode without commutation (TV4 is within TV2).

FIG. 11 shows the time curve of the motor sum current. The sawtooth pattern of the current curve indicates that the motor is powered in the pulse mode. The current generally varies between a maximum value $I_{max}$ and a minimum value $I_{min}$. This ensures that the mean current value, and therefore the motor speed, is substantially constant. The pulse mode has predetermined time characteristics. After commutation at PC, there is initially a current drop γ in the time TV3 to the value $I_{min}$, which is followed by a current rise δ to the value $I_{max}$ at PA. An IRQ commutation request may occur at any arbitrary point within the time period TV2. This time period is typical of the motor pulse mode. It comprises a current drop α during the time TV4 followed by a current rise β. The requested commutation is delayed until the time TV2 has elapsed. This means, commutation is postponed to the next pulse-off time TV4, preferably to PC marking the end of the current rise β to the value $I_{max}$ and the start of the current drop γ. Postponement of the commutation point by a maximum period of time TV2 does not affect the motor control, as TV2 is short compared to the commutation periods.

The rise and drop of the motor energizing current depend on the motor inductance and the motor speed.

In the case of a standstill of the motor or at a low speed, the generator effect, the formation of a counter-electromotive force, is non-existent or negligible. As the speed increases, the current rise (the pitch of a "current tooth") decreases or the current drop (its pitch) increases. These facts are to be taken into account when the variables TV1 to TV4 are computed. The control voltage pulse periods TV1 and TV2 as well as the pulse-off times TV3 and TV4 must be accurately defined for maintaining the mean current value.

The control algorithm will be described below. For this purpose, attention is initially drawn to three successive IRQ pulses (see FIG. 7A) $Z_{p-2}$, $Z_{p-1}$, $Z_p$. The times of these pulses can be easily determined by electronic time measurement, using, for example, a ring counter (included in the microcomputer) which is read each time an IRQ pulse occurs.

$Z_p$ is assumed to be the time of the last IRQ pulse, $Z_{p-1}$ the time of the penultimate IRQ pulse and $Z_{p-2}$ the time of the ante-penultimate IRQ pulse.

By subtraction, the commutation periods T and $T_{alt}$ are obtained which are a measure of the instantaneous speed of the motor between the individual IRQ pulses.

$$T = (Z_p) - (Z_{p-1})$$

$$T_{alt} = (Z_{p-1}) - (Z_{p-2})$$

As used herein, T represents the time difference between the last IRQ request and the penultimate IRQ request, $T_{alt}$ represents the time difference between the penultimate IRQ request and the ante-penultimate IRQ request, and $T_{nom}$ represents the desired time difference between IRQ requests corresponding to the desired speed.

Subtraction of the times T or $T_{alt}$ from a time $T_{nom}$ corresponding to the desired speed yields $$DT = T_{nom} - T$$

$$DT_{alt} = T_{nom} - T_{alt}.$$

These values are a measure for the speed deviations in the last or penultimate time defined by the relevant IRQ signals $Z_p$, $Z_{p-1}$ and $Z_{p-2}$.

These values DT and $DT_{alt}$ are used to compute TV1 to TV4 according to the following formulas:

$$TV1 = C1 + TV1_{alt} + G1 \times DT + P \times (DT - DT_{alt})$$

$$TV2 = C2 + A2 \times TV1$$

$$TV3 = C3 + A3 \times TV1$$

$$TV4 = C4 + A4 \times TV1$$

C1 to C4 are constants of the drive system which, like all other factors, are experimentally or analytically determined.

G1 is the gain factor for control if the time $DT \neq 0$ (speed deviation).

P is the weighted past factor for avoiding motor oscillations.

A2 to A4 are attenuation factors, as TV2, TV3 and TV4, although depending on TV1, are shorter than TV1.

The formula for computing TV1 shows that the new time TV1 depends on the old time $TV1_{alt}$. For this purpose, $TV1_{alt}$ is the time required by the preceding and elapsed "control voltage pulse period" in the case of commutation. TV1 increases as long as the actual speed is less than the desired speed, i.e., as long as $DT > 0$ and $(DT - DT_{alt}) < 0$, respectively. TV1 decreases as long as the actual speed exceeds the desired speed, i.e., as long as $DT < 0$ and $(DT - DT_{alt}) > 0$, respectively. TV2 to TV4 are values derived from TV1 which serve to maintain the mean value of the motor energizing current. The formulas show that control is primarily determined by TV1. TV1 is, as is known, the time required for the current drop and the current rise after commutation. They also show that TV1 depends on $TV1_{alt}$ for the preceding computation, the instantaneous speed deviation DT and the instantaneous acceleration $(DT - DT_{alt})$.

Figure 12:
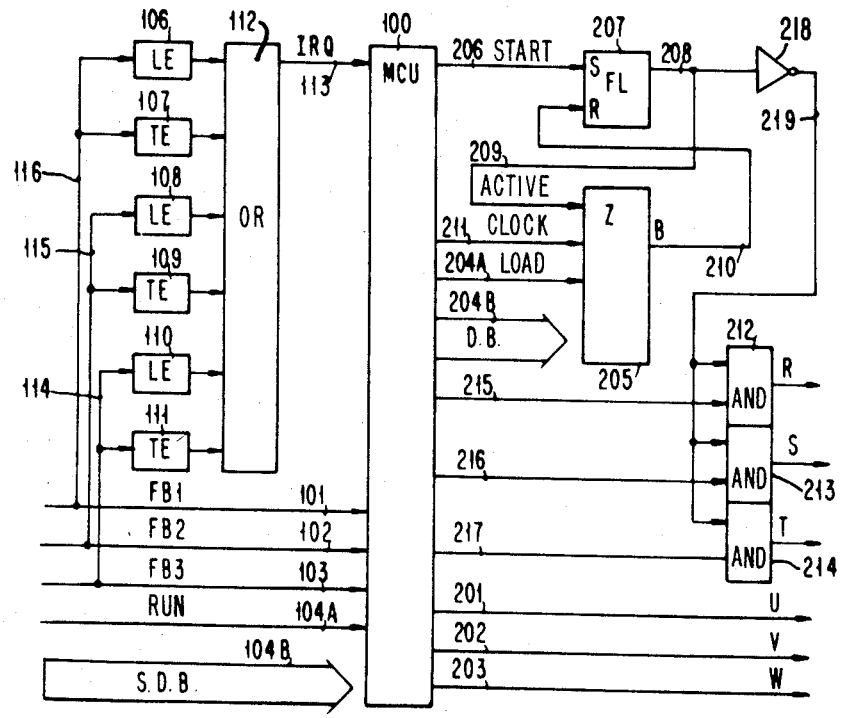
FIG. 12 is a graph circuit with microcomputer for generating the control signals for the motor driver circuit.

FIG. 12 is a block diagram for the microprocessor-controlled determination of the pulse and commutation times. This circuit consists of a micro computer 100. Through lines 101, 102 and 103, the binary states of the signal sequences FB1, FB2 and FB3 are fed as logical 1 or 0 for the positive and negative signal level, respectively, to the micro computer unit MCU 100 (MCU=-micro computer unit). It has been previously pointed out that the so-called IRQ signals are derived from the edges of the FB1, the FB2 and the FB3 signal sequence. For this purpose, line 101 for the FB1 signal sequence is connected through line 116 to an edge detector circuit 106 "LE" for the leading edge and to an edge detector circuit 107 "TE" for the trailing edge. Analogously, line 102 for the FB2 signal sequence is connected through line 115 to an edge detector circuit 108 for the leading edge and to an edge detector circuit 109 for the trailing edge, whereas line 103 is connected through line 114 to an edge detector circuit 110 for the leading edge and an edge detector circuit 111 for the trailing edge of the signals of the FB3 signal sequence. Upon the occurrence of an edge, the outputs of the edge detector circuits 106 to 111 emit output pulses which through OR gate 112 are combined to form the IRQ pulses on line 113. These IRQ pulses are the request signals for commutation and time measurement. They are fed to the microprocessor 100. The IRQ pulse sequence is shown in FIG. 7A.

In addition, a so-called commutation table, as shown in FIG. 9, is stored in the storage of micro computer 100. The commutation steps in this table are, similar to FIGS. 7 and 8, designated as 1 to 6. It is pointed out that this table refers to the embodiment of the motor of FIG. 5 in connection with FIGS. 6, 7 and 8. FIG. 7 shows, for example, that for commutation step 1, FB1 has a positive signal level, whereas FB2 and FB3 negative signal levels equal to zero. Thus, the table in the micro computer shows the commutation step sequence. When the motor is started, the microprocessor reads the level of the FB1, the FB2 and the FB3 signal sequence on lines 101, 102, 103 and is capable of defining the start position in the table from the actual levels of these lines. Thus, it is known with which step commutation of the motor is to start. If this starting point is known, the subsequent commutation steps are cyclically incremented upon the occurrence of an IRQ interrupt request.

If, for example, the starting point coincides with commutation step 5, the next commutation step is 6, followed by commutation steps 1, 2, etc. As previously mentioned, the request signals are derived from the IRQ signals.

After a particular angle of rotation (half a rotation or a full rotation), the micro computer 100 tests whether the signal sequences FB1, FB2, FB3 and the IRQ signals are synchronous (because the IRQ signals are susceptible to faults). This means, the micro computer 100 reads lines 101, 102 and 103 to determine the state of commutation (commutation steps 1 to 6). If the driver combination R, S, T, U, V, W, belonging to a commutation step, differs from the associated signal combination FB1, FB2, FB3, forcible synchronization is effected in each commutation step to select the respective driver combination for a given sequence. If the corrections that have to be made are too frequent, if the FB1, FB2, FB3 signal sequences are faulty, or if the FB1, FB2, FB3 signal combination is not defined in the table, the micro computer signals a fault and switches off the motor.

When the motor is started, there is, of course, no value $TV1_{alt}$ or $T_{alt}$ for computing the values TV1, TV2, TV3 and TV4. Thus, a predetermined maximum value is used for TV1, and the time variables TV2 to TV4 are computed on its basis, so that the starting currents may be limited.

Each line of the table of FIG. 9 stores binary control information for each control voltage of the driver transistors. A binary "1" for R for commutation step 1 means that for the respective FB1, FB2 and FB3 signal combination, the transistor for the pulsed control voltage R and the transistor for the control voltage V are to be switched on. Thus, the signal states for FB1, FB2 and FB3 are synchronized with the commutation states of the driver transistors.

The micro computer comprises a 16-bit ring counter, not shown, which is incremented at a clock time of one-millionth of a second. Each IRQ pulse causes the microprocessor to branch from a main routine to an interrupt routine to read the state of the free-running ring counter. By subtracting the current counter value from the last value read, a time value for a 30° motor rotation is obtained, so that also the instantaneous motor speed is known.

A more sophisticated and accurate approach for determining the speed would be to use pulse generators (Hall effect sensors) with a finer division of angles than in the chosen embodiment (30°).

It has been previously pointed out that the driver transistors A1, B1, C1 are switched on or off by their control voltages U, V, W. Using the table values of FIG. 9, they can be directly controlled by the micro computer 100 through lines 201, 202, 203. A binary 1 for the control voltage means that for the given commutation step the associated driver transistor is switched on. The driver transistors A2, B2, C2 on the other hand are pulsed as shown in FIG. 10. The micro computer provides and computes the pulse control signals with regard to their ON and OFF times. The pulsed (R, S, T) and non-pulsed (U, V, W) control signals for the driver transistors are schematically represented in FIG. 10. However, for simplicity, the pulsed and non-pulsed control signals in this figure, in contrast to FIG. 7B, are not all synchronized with each other in time. As previously mentioned, the pulse-on and pulse-off times for a pulsed control signal sequence are computed. During the usual pulse mode, the times concerned are TV2 and TV4, as shown in the partly enlarged representation on the right in FIG. 10. The occurrence of a commutation leads to a control voltage pulse period TV1, FIG. 11, with a pulse-off time TV3, as shown in FIG. 10.

In the circuit of FIG. 12, an additional circuit element serves to time the pulse-off times TV3 and TV4. This measure is used to relieve the micro processor, so that it becomes free to carry out complex new computations for the control algorithm.

The control value for TV3 and TV4 is determined by the microcomputer and loaded during the pulse-on time, by lines 204A and 204B, into the down counter 205 (with the load command appearing on line 204A and the time value TV3 or TV4 to be loaded through line 204B). After TV1 or TV2 has elapsed, a start signal is generated by the computer and applied, through line 206, to a flip-flop 207, whose output signal appears on line 208. This signal initiates the start (down count) of counter 205 through line 209. After the count value 0 has been reached, the counter emits a signal on its output line 210, by means of which the flip-flop 207 is reset, terminating the count of counter 205 (through lines 208 and 209).

In addition, it is pointed out that counter 205 receives its clock pulses from microcomputer 100 through line 211. During the down count of counter 205, the output signal of flip-flop 207 is also fed to the three AND gates 212, 213 and 214 by line 208, inverter 218 and line 219. AND gate 212 serves to supply the control voltage R, AND gate 213 the control voltage S and AND gate 214 the control voltage T. Through its second input 215, AND gate 212 receives the non-pulsed control voltage R from microprocessor 100. The relevant data are derived from the table, FIG. 9, stored in the microcomputer. Through its second input 216, AND gate 213 receives the non-pulsed control voltage S from the microcomputer. Through its second input 217, AND gate 214 receives the non-pulsed control voltage T from the microcomputer.

In other words, the table of FIG. 9 shows which of the three control signals R, S, T must be active for a commutation step. For this active period, the microcomputer computes the times TV4, TV2, TV3 and TV1, respectively, as previously mentioned. The microcomputer determines the time intervals TV1 and TV2 by means the start pulse sequence on line 206 and the pulse-off times TV3 and TV4 by loading the counter. In this manner, the pulsed control voltages R, S and T are available at the outputs of the three AND gates 212, 213 and 214. Assuming that the nonpulsed control voltage R is applied through line 215 to AND gate 212 for the time TV2, then AND gate 212 is disabled at its second input through line 219 for the time TV3 or TV4, because in these times, during which counter 205 counts downwards, an output signal, inverted by inverter 218, is applied to output 208 of flip-flop 207. In the absence of pulse-off times TV2–TV4 and TV1–TV3, respectively, no output signal is applied to line 208, so that during these times the first inputs of AND gates 212, 213 and 214 are enabled by inverter 218.

For AND gate 212 this means that the second input 215 is enabled during TV1 and TV2, respectively, whereas the first input 219 is enabled during TV1–TV3 and TV2–TV4, respectively. This means, it is only during the times TV1–TV3 and TV2–TV4, respectively, that a (pulsed) control signal is available at the output of the AND gate 212 (pulse-off time TV3 or TV4, pulse-on time TV1–TV3 or TV2–TV4).

This applies in analogy to the control voltages S and T in connection with the AND gates 213 and 214. Of the control voltages R, S, T, only one is active at any one time.

FIGS. 7 and 9 show that the control voltages R, S, T do not overlap each other in time. As a result, only one of these control voltages is pulsed at any one time, while the other control voltages remain connected to ground potential during that pulse time. In this manner, the circuit part comprising the flip-flop 207 and the down counter 205 can be successively used for providing the pulse-off times for the control voltages R, S, T.

For the sake of completeness it is pointed out that the microcomputer receives the motor run instruction (RUN) through the lines 104A and information on the speed at which the motor is to be operated through line 104B.

Figure 16:
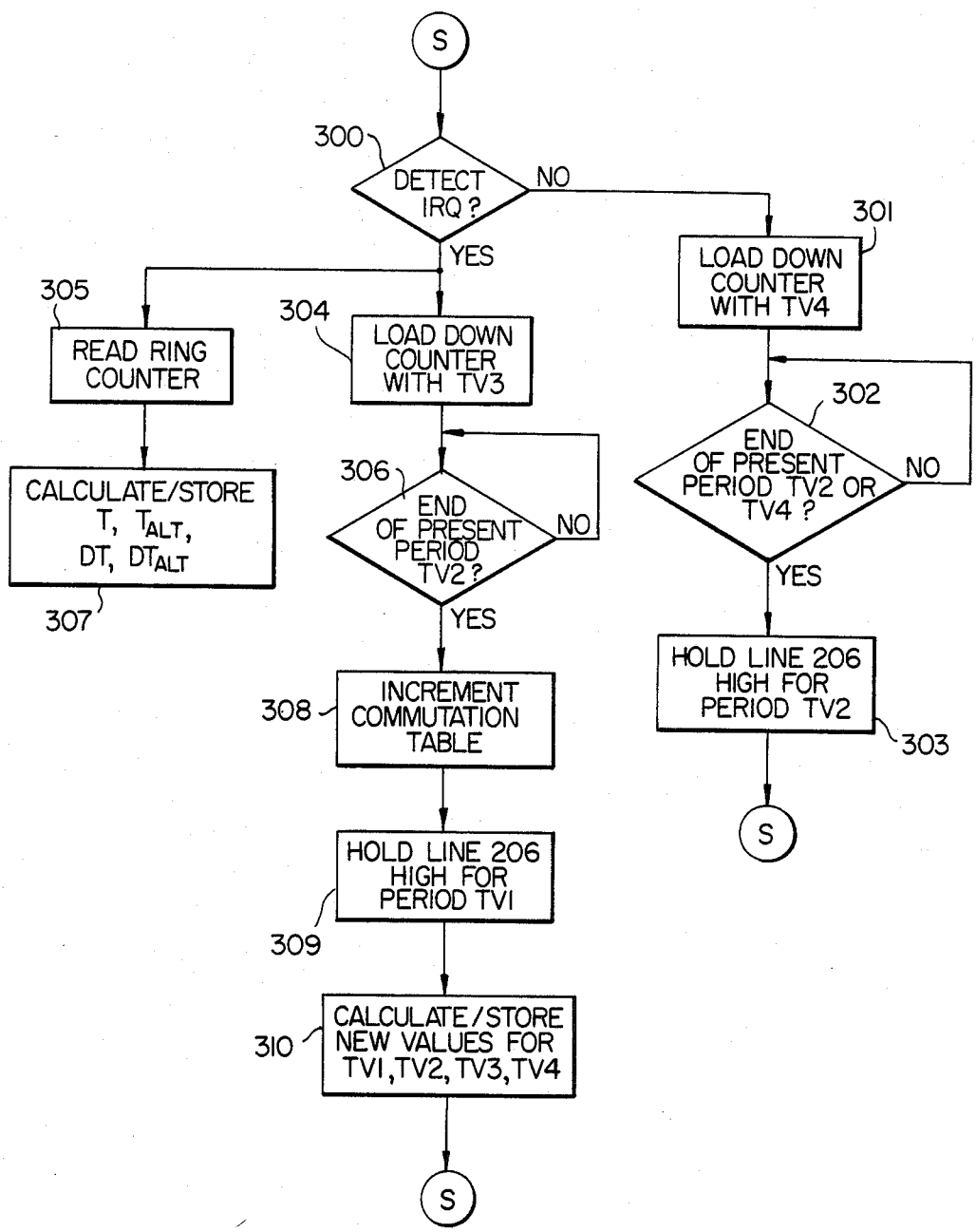
FIG. 16 is a flow chart of the execution steps of the microcomputer of FIG. 12.

Referring to FIGS. 16 and 12 to describe the execution steps of microcomputer 100, starting at point S, control is transferred to block 300 where microcomputer 100 checks for the detection of an IRQ interrupt signal on line 113. If no IRQ is detected (i.e., the system is operating between commutation points PC, FIG. 11), control is transferred to block 301 where time value TV4 is loaded via line 204B into down counter 205. Control is then transferred to block 302 where the end of the present control voltage pulse period (TV1 or TV2) is awaited. Upon detection of the end of the present control voltage pulse period, control is transferred to block 303 and microcomputer 100 begins holding line 206 high for a time TV2. At the beginning of this hold-up time, control is transferred back to block 300 for detection of an IRQ request during the period TV2.

Should block 300 detect an IRQ request, control is transferred to blocks 304 and 305. Block 304 loads down counter 205 via line 204B with time value TV3. The end of the present period TV2 is then awaited in block 306. At the same time, block 305 reads the free running ring counter value and then transfers control to block 307 to calculate the values of T, $T_{alt}$, DT and $DT_{alt}$ (defined earlier).

When block 306 detects the end of the present period TV2, control is transferred to block 308 where the commutation table (FIG. 9) is incremented by one position. Control is then transferred to block 309 where microcomputer 100 holds line 206 high for a time TV1. At the beginning of the hold-up time, control is transferred to block 310 where new values of TV1, TV2, TV3 and TV4 are calculated using the updated values of DT, $DT_{alt}$ (calculated by block 307) and the old value of TV1. Control is then transferred back to block 300 for continued operation.

It has been previously pointed out that the time $T_{alt}$ of the preceding commutation period is used to compute TV1 of the current commutation period T.

This value T or $T_{alt}$ may also serve as a mean value for several successive "commutation periods"; in this manner, tolerances in positioning the Hall effect sensors are compensated for.

The illustration in FIG. 11 concerns the "balanced state" in which there are no load changes of the motor drive system and thus no changes in the mean value of the motor sum current. In such a state, in which there are no load changes, the current varies between $I_{max}$ and $I_{min}$, and the motor torque depends on the mean value of the motor sum current.

Figure 13:
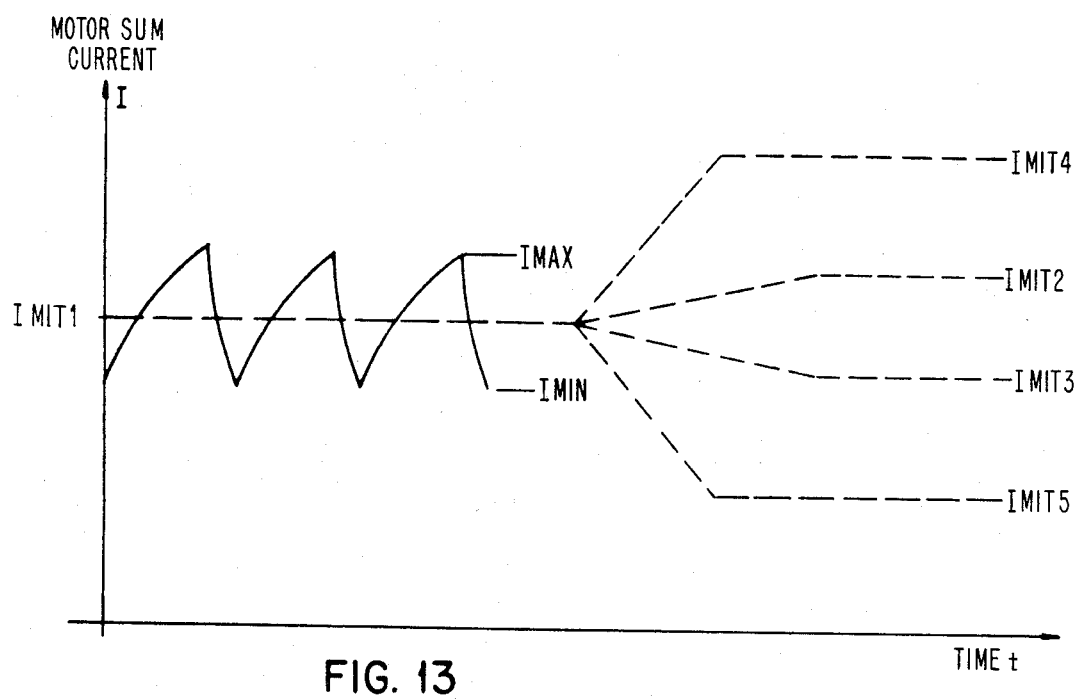
FIG. 13 is a graph of the time curve of the mean value of the motor sum current in the case of varying load changes.

FIG. 13 shows how load changes may affect the mean value of the motor sum current. In the left part of the figure, the mean value of the motor sum current for a state without load changes (comparable to the illustration in FIG. 11) is designated as $I_{mit1}$. In the case of load changes, this mean value changes, too, adopting, for example, as a result of small changes (rising or dropping loads), the values $I_{mit2}$ and $I_{mit3}$, respectively. In the case of greater load changes (rising or dropping loads), the mean value changes to $I_{mit4}$ and $I_{mit5}$, respectively.

For clarity, the sawtooth curve of the motor sum current occurring in the pulse mode has been omitted in the right part of FIG. 13 which shows only the mean values of the motor sum current.

A load change of the motor drive system leads to a change of the speed characteristics. However, a change in the speed characteristics influences the values TV1, TV3, TV4, TV2. These values are determined in such a manner that in a state where there are no load changes of the motor drive system, the variations of the current values are sawtooth-shaped, ranging from $I_{max}$ to $I_{min}$. However, load changes occurring may lead to the absolute limits of $I_{max}$ and $I_{min}$ being changed to higher or lower values, thus also changing the mean value of the motor sum current. Transition from one load state, in which the mean value of the motor sum current is $I_{mit1}$, to another load state, in which the mean value of the motor sum current is $I_{mit4}$, is effected by suitably determining the values TV1, TV3, TV2, TV4 to be calculated.

In contrast to synchronous motors, small speed changes of the motor drive system may be counteracted by a substantial current change (i.e., the mean value of the motor sum current), so that the speed can be rapidly controlled.

If the motor load changes slowly, the control voltage pulses are predetermined so that there is only a slight change in the mean motor current, whereas for fast motor load changes, the control voltage pulses are predetermined so that there is a relatively great change in the mean motor current.

Figure 14:
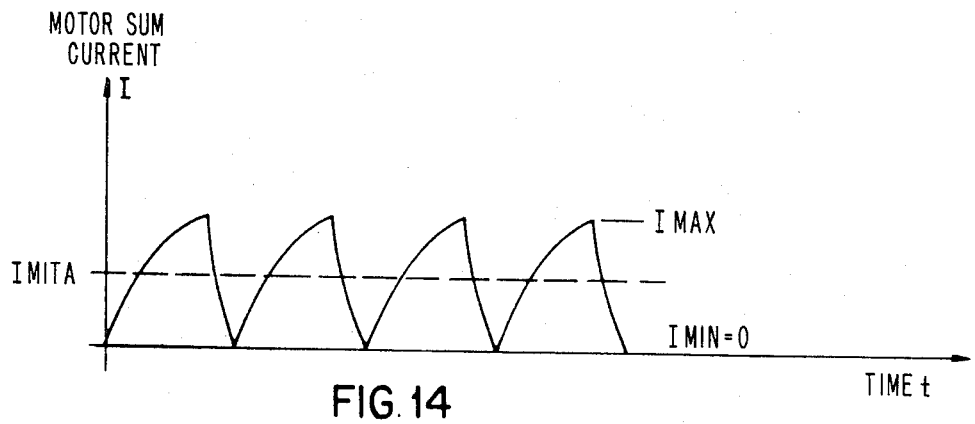
FIG. 14 is a graph of the sawtooth curve of the pulsed motor sum current during a time in which there is no load change of the motor drive system and in which the current valleys have the value zero and the mean motor sum current has the value $I_{mitA}$.

FIG. 13 shows that a load change may lead to a change in the limits of $I_{max}$ and $I_{min}$. Such a change may be, for example, as shown in FIG. 14, with the lower current peaks of the sawtooth curve of the motor sum current adopting the value $I_{min}=0$, so that the mean value of the motor sum current is $I_{mitA}$. This value $I_{mitA}$ corresponds to a relatively low torque of the motor, as the torque is proportional to the mean motor sum current. A further drop in the load of the motor drive system would result in a mean motor sum current that is less than the value $I_{mitA}$ in FIG. 14.

Figure 15:
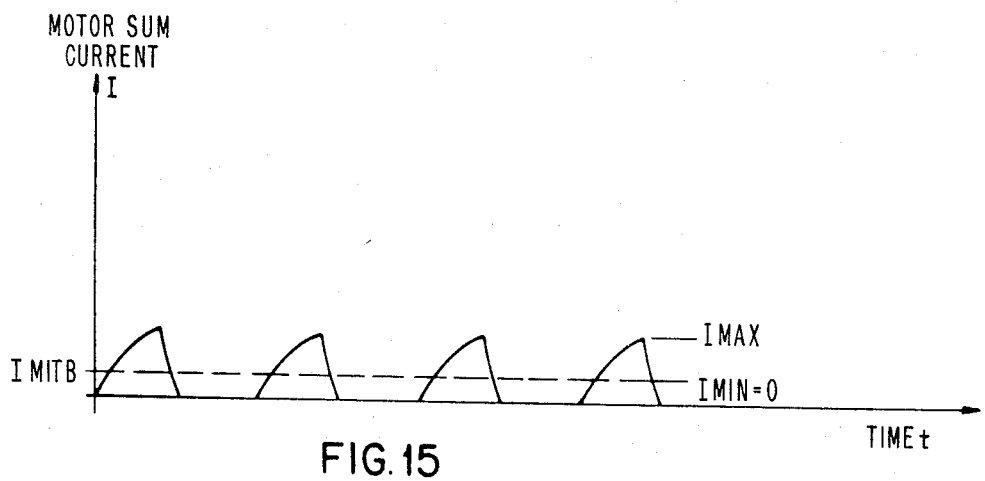
FIG. 15 is a graph of the time curve of the pulsed motor sum current, at which there is a time period greater than zero between a drop of the motor current to the value zero and the start of a subsequent rise in the motor current.

In this connection, attention is drawn to FIG. 15. In this figure, the lower part of the assumed sawtooth curve of the motor sum current is "cut off", so that between a motor current drop to the value zero and the start of a subsequent rise in the motor current there is a time greater than zero. Thus, the mean value of the motor sum current $I_{mitB}$, which is derived from the "upper" current peaks, is less than the value $I_{mitA}$ in FIG. 14.

Finally, it is pointed out that the motor may be decelerated as follows:

In accordance with one approach, deceleration is effected by merely doing without commutation, so that the magnetic field stops moving. For this purpose, the stationary magnetic field has the tendency to retain the external rotor, decelerating it. During this, the stator acts as a "retaining" spring.

In accordance with an improved, but slighly more elaborate approach, one commutation point is suppressed, so that there is a negative lead angle of the external rotor. As a result, the magnetic field lags behind the external rotor, trying to "retain" it. Analogously, spring means would corotate with the rotor, constantly decelerating the motor with their optimum force.

We claim:

1. A method for the constant speed control of a brushless DC motor whereby a pulsed control voltage is applied between commutation points of motor pole windings thereof, comprising the steps of:

calculating the pulse-on times and pulse-off times of the pulsed control voltage according to the speed characteristics of the motor; applying the pulsed control voltage to the motor pole windings so that the motor sum current substantially rises during the pulse-on time and substantially drops during the pulse-off times; and synchronizing the commutation points with the pulse-off times of the pulsed control voltage;

wherein the speed characteristics used to calculate the pulse-on and pulse-off times include the values of:

the deviation of the motor speed from a desired speed value;

the instantaneous acceleration of the motor;

the time duration of a control voltage pulse period of a preceding commutation period; and constants characterizing the motor drive system; and wherein, upon starting the motor, the control voltage pulse period is limited to a predetermined maximum value.

2. The method according to claim 1 wherein, in the case of slow motor load changes, the control voltage pulses are predetermined in such a manner that there is a relatively small change in the mean motor sum current.

3. The method according to claim 1, wherein, in the case of fast motor load changes, the control voltage pulses are predetermined in such a manner that there is a relatively great change in the mean motor sum current.

4. The method according to claim 2 or 3, wherein for a low mean motor sum current the minimum value of motor sum current is substantially zero.

5. The method according to claim 4 wherein for a very low mean motor sum current, there is a time period, greater than zero, between a drop of the motor sum current to the value zero and the start of a subsequent rise of the motor sum current.

6. A method for the constant speed control of a brushless DC motor whereby a pulsed control voltage is applied between commutation points of motor pole windings thereof, comprising the steps of:

calculating the pulse-on times and pulse-off times of the pulsed control voltage according to the speed characteristics of the motor;

applying the pulsed control voltage to the motor pole windings so that the motor sum current substantially rises during the pulse-on time and substantially drops during the pulse-off times; and synchronizing the commutation points with the pulse-off times of the pulsed control voltage;

wherein the speed characteristics used to calculate the pulse-on and pulse-off times include the values of:

the deviation of the motor speed from a desired speed value;

the instantaneous acceleration of the motor;

the time duration of a control voltage pulse period of a preceding commutation period; and constants characterizing the motor drive system; and wherein in the case of commutation occurring upon the start of the pulse-off time, the control voltage pulse period, consisting of a pulse-off time and a pulse-on time, is determined on the basis of the time duration of the preceding commutation period, and wherein, in between two commutation points, the control voltage pulse period is determined to have the same value for all control pulse periods consisting of a different pulse-off time and a different pulse-on time.

7. The method according to claim 6, wherein the pulse-on and pulse-off times of the pulsed control voltage are calculated according to the following control algorithm:

$$TV1 = C1 + TV1_{alt} + G1 \times DT + P \times (DT - DT_{alt})$$

$$TV2 = C2 + A2 \times TV1$$

$$TV3 = C3 + A3 \times TV1$$

$$TV4 = C4 + A4 \times TV1$$

where:

$DT$ is the time difference between a time value corresponding to the desired speed and the actual speed for a current commutation period;

$DT_{alt}$ is the time difference between a time value corresponding to the desired speed and the actual speed for a commutation period preceding a current commutation period;

$TV1_{alt}$ is the TV1 control voltage pulse period previously computed for the commutation period preceding a current commutation period;

$G1$ is the constant gain factor;

$P$ is the constant weighted past factor;

$A2$–$A4$ are constant attenuation factors;

$C1$–$C4$ are constants of the motor drive system;

$TV1$ is a control voltage pulse period consisting of a pulse-off time $TV3$ and a pulse-on time for the motor current formed as a result of a current drop and a current rise, and in which commutation is effected upon the start of a current drop;

$TV3$ is the current drop time in the control voltage pulse period $TV1$;

$TV2$ is the control voltage pulse period consisting of the pulse-off time $TV4$ and the pulse-on time for the motor current without commutation formed as a result of a current drop and a current rise; and $TV4$ is the current drop period in the control voltage pulse period $TV2$.

8. The method according to claim 7 wherein the time difference $DT$ is determined as an average value of several preceding commutation periods.

9. An apparatus for the constant speed control of a brushless DC motor wherein a motor drive circuit applies a pulsed control voltage between commutation points to motor pole windings thereof including:

means for sensing the speed characteristics of the motor;

means for calculating the pulse-on times and pulse-off times of the pulsed control voltage according to said speed characteristics of the motor;

means for applying said pulse-on and pulse-off times to said motor drive circuit whereby the motor sum current substantially rises during the pulse-on time and substantially drops during the pulse-off time;

means for synchronizing the commutation points with the pulse-off times of the pulsed control voltage;

a microcomputer adapted to receive, as inputs thereto, signals denoting the individual commutation points of the motor, signals denoting the individual commutation steps of the motor, and signals denoting the desired motor speed;

said microcomputer having a calculating station for calculating the pulse-on and pulse-off times for the pulsed control voltage for pulse periods with and without commutation according to a control algorithm and using the motor speed derived from the timing of said signals denoting the individual commutation points of the motor;

said microcomputer further having a memory with a stored table which is cyclically addressed in the commutation sequence of the motor by said signals denoting the commutation steps whereby each table step provides information for determining the individual commutation steps and respective control signals for said motor drive circuit;

whereby at the times of commutation, the pulsed control voltage is emitted only at the end of a commutation step triggered by said signals denoting the individual commutation points and delayed into a pulse-off time of the pulsed control voltage.

10. An apparatus circuit according to claim 9 additionally including:

a clock signal generating means;

a clock-controlled down counter, for counting said pulse-off time, said pulse-off time being loaded into said down counter by said microcomputer;

a flip-flop, which is set by said microcomputer at the time of commutation, for activating said clock-controlled down counter, said flip-flop being reset by said down counter after completion of a down count; and a plurality of two-input AND gates for controlling said motor drive circuit, the first input of each respective AND gate being connected to the output of said flip-flop and the second input of each respective AND gate being connected to respective commutation step signals provided by said microcomputer.

* * * * *